(12) United States Patent
Feil

(10) Patent No.: US 6,589,041 B2
(45) Date of Patent: Jul. 8, 2003

(54) APPARATUS FOR SHAPING THERMOPLASTIC MATERIALS

(75) Inventor: Jürgen Feil, Loebendorf (DE)

(73) Assignee: Paul Kiefel GmbH, Freilassing (DE)

( * ) Notice: Subject to any disclaimer, the term of this patent is extended or adjusted under 35 U.S.C. 154(b) by 136 days.

(21) Appl. No.: 09/795,831

(22) Filed: Feb. 28, 2001

(65) Prior Publication Data
US 2001/0018080 A1 Aug. 30, 2001

(30) Foreign Application Priority Data
Feb. 28, 2000 (DE) .......................... 100 09 405

(51) Int. Cl.[7] .............................................. B29C 51/08
(52) U.S. Cl. .................. 425/387.1; 425/388; 425/394; 425/809; 249/65
(58) Field of Search ..................... 425/387.1, 388, 425/390, 394, 809; 249/65

(56) References Cited

U.S. PATENT DOCUMENTS

| | | | | |
|---|---|---|---|---|
| 3,726,953 A | * | 4/1973 | Jones et al. ................ | 264/547 |
| 3,753,830 A | * | 8/1973 | Cruckshank et al. ........ | 425/388 |
| 4,842,742 A | * | 6/1989 | Plante ........................ | 264/522 |
| 5,074,773 A | * | 12/1991 | Tischler ...................... | 425/134 |
| 5,759,591 A | * | 6/1998 | Rhoades et al. ........ | 425/387.1 |
| 6,315,295 B1 | * | 11/2001 | Sym ........................... | 249/63 |

* cited by examiner

Primary Examiner—Robert Davis
Assistant Examiner—Thu Khanh T. Nguyen
(74) Attorney, Agent, or Firm—Cohen, Pontani, Lieberman & Pavane

(57) ABSTRACT

The apparatus for shaping thermoplastic materials, in particular for producing moulded parts with a large height of the moulded part, comprises a suction-pressure bell and a lower part which can be locked to each other by a locking device. Resting on the lower part are a mould and a clamping frame, while the upper clamping frame can be securely clamped by working cylinders. In the locked state, the clamping frames are braced by a seal, which is arranged between the suction-pressure bell and the upper clamping frame. The seal extends over the entire circumference of the suction-pressure bell and is able to be pressed against the upper clamping frame by a pressure medium.

8 Claims, 4 Drawing Sheets

APPARATUS FOR SHAPING THERMOPLASTIC MATERIALS

BACKGROUND OF THE INVENTION

1. Field of the Invention

The invention relates to an apparatus for shaping thermoplastic materials, comprising a suction-pressure bell, an upper clamping frame, a lower clamping frame, between which the material to be shaped is able to be clamped, and a lower part with a mould.

2. Description of the Related Art

In a known apparatus of this type, for the moulding operation, in which compressed air is introduced into the pressure bell in order to press the film material against the mould, the pressure bell and the lower part supporting the mould are pressed against each other by a hydraulically activated drive device, in order to absorb the forces, tending to separate the pressure bell and the lower part, together with the clamping frame lying in between. In the case of large parts, such as for example refrigerator inserts, very large forces, for example of 800 kN and greater, may occur. A major problem which arises in this respect is constituted not only by the very high holding forces which are necessary in order to press the pressure bell and its lower part against each other but also by the fact that only clamping frames which are essentially adapted to the length and width of the pressure bell can be used. If, on the other hand, small moulds are to be used for producing smaller parts, other clamping frames, i.e. clamping frames with a significantly smaller through-opening, must be used. Since the upper clamping frame must bear in a sealing manner against the pressure bell, this clamping frame keeps a relatively large surface area on which the pressure in the pressure bell acts, based on a pressure bell for large parts to be produced, when a changeover is made to small parts to be produced. The surface area of the clamping frame is so great because it has a small through-opening because of the smaller mould but still must reach up to the rim of the pressure bell because of the sealing. The pressure applied in the pressure bell then acts on this large surface area of the upper clamping frame, which leads to a deformation of the clamping frame because the clamping force which is transferred from the lower part via the lower clamping frame to the upper clamping frame, acts with greater leverage in the case of clamping frames with a small opening than in the case of clamping frames with a large opening. At the same time, the relatively great forces are also transferred to the seal which is provided between the pressure bell and the upper clamping frame. This seal is made in the form of a round rubber cord and can therefore not be shaped in any way desired, for example to compensate for tolerances in the thickness dimensions of the upper clamping frame and also different thicknesses of the material to be shaped. To avoid the greatest disadvantages, it is known to use stops which limit excessive force acting on the upper clamping frame and the seal when the pressure bell and the lower part are moved together. In this case, however, the overall apparatus is even more sensitive with respect to tolerances occurring at the upper clamping frame flange and with respect to the material thickness of the material to be shaped.

SUMMARY OF THE INVENTION

The object of the invention is to design an apparatus wherein the seal is not squeezed or otherwise impaired when the suction-pressure bell and the lower part are moved together, wherein the sealing effect can be adapted to the prevailing internal pressure in the suction-pressure bell and wherein it is possible to compensate for thickness tolerances at the flange of the upper clamping frame and with respect to the material to be moulded.

This object is achieved by providing a seal which can be expanded under controllable force between the suction-pressure bell and the upper clamping frame.

This design has the advantage that the upper clamping frame can be held in the moulding position by a preliminary loading of the seal. Since the seal is expandable arbitrarily by force action, which is controllable, it can be adapted in its sealing action to the respectively prevailing pressure conditions in the interior space of the suction-pressure bell. Since the seal is expandable arbitrarily under force action, it is readily possible to compensate for dimensional tolerances with respect to the thickness dimensions of the flange of the upper clamping frame and also with respect to changes in the thickness of the material to be shaped.

The advantages of this design become particularly evident if, in a further design of the invention, the suction-pressure bell and the lower part, supporting the mould, are able to be connected to each other by a force-absorbing device, which completely absorbs forces occurring during the moulding operation.

The suction-pressure bell and the assigned lower part and also the clamping frames arranged in between are held together by this force-absorbing device and are not pressed together as in the prior art. The high forces occurring in the compressive shaping are thus absorbed by the force-absorbing device, so that only significantly lower forces act, in particular on the clamping frames, than was the case when the two parts were pressed against each other, because the pressing of the suction-pressure bell and the lower part these mutual pressing forces also to be transferred via the clamping frames. If, on the other hand, the suction-pressure bell and the lower part are held together by externally applied force-absorbing devices in a way corresponding to the present invention, the two frames arranged between the suction-pressure bell and the lower part are largely free from the enormous forces. This is because the force resulting from the pressure of approximately 4 bar and the surface area of the suction-pressure bell in the separating region does not act on the clamping frame and the mould, and consequently on the lower part. Instead these forces act via the mould on the lower part, where they are absorbed by the externally arranged locking devices, so that there is largely no longer any force transfer, in particular via the clamping frames. It goes without saying that forces act on the clamping frames, in particular if they expose a significantly smaller opening than corresponds to the surface area of the suction-pressure bell in the separating region. However these forces can be absorbed by corresponding shaping of the clamping frames, because they are significantly lower than when the entire forces are transferred via the clamping frame to the lower part, as is the case in the prior art.

The term "suction-pressure bell" is intended to express the idea that, before the compressive shaping, the film or sheet is drawn into the suction-pressure bell by sucking action and in this way is preshaped.

The force-absorbing device, formed as a locking device, preferably has locking bars fixedly arranged on the circumference of the suction-pressure bell which, in the joined-together state of the suction-pressure bell and the lower part, are able to be fixed by coupling devices arranged on the lower part. These coupling devices may be formed as quick-clamping devices, which grasp and securely hold the ends of the locking bars. By appropriate dimensioning and selection of the necessary number of locking bars, the very high forces can be absorbed by these locking bars and their coupling devices, and no clamping forces of any great magnitude have to be applied here in order to hold together the ends of the locking bars and the parts of the coupling device.

The advantages of the design according to the invention with regard to the arrangement of an expandable seal are also achieved if the suction-pressure bell and the lower part are able to be pressed against each other by respective drive devices, in particular if the mutual pressing force is limited by stops.

The seal between the suction-pressure bell and the upper clamping frame, which was previously severely compressed by the external pressing forces, is now relieved of the great forces via the locking device. In a development of the invention, the seal is accommodated in a groove of the suction-pressure bell and is able to be pressed against the upper clamping frame by a pressure medium for sealing between the suction-pressure bell and the clamping frame. In the design according to invention, the seal is no longer subjected to the external pressing forces directed against one another but is now loaded only to the degree necessary for sealing by a pressure medium, in order to avoid a decline in the positive pressure in the suction-pressure bell.

A further advantageous design consists in that the seal is formed as an inflatable tubular seal. This expandable seal only needs to withstand the internal pressure in the suction-pressure bell or in the narrow gap between the suction-pressure bell and the upper clamping frame and is not subjected to any pressing forces, as is the case with the known apparatuses.

The suction-pressure bell can preferably be vertically displaced by a drive device in order to permit demoulding to be carried out in particular in the case of positive moulds.

In a further design of the invention, the lower part can be moved together with the mould and the lower clamping frame against the suction-pressure bell by a drive device. The lower part and the mould are able to be connected to a negative pressure source.

For easier handling of the upper clamping frame, the upper clamping frame is able to be held in position on the suction-pressure bell by hydraulically or pneumatically activatable working cylinders.

BRIEF DESCRIPTION OF THE DRAWINGS

The invention is explained in more detail below on the basis of an exemplary embodiment. In the drawing.

DETAILED DESCRIPTION DESCRIPTION OF THE PRESENTLY PREFERRED

Figure 1:
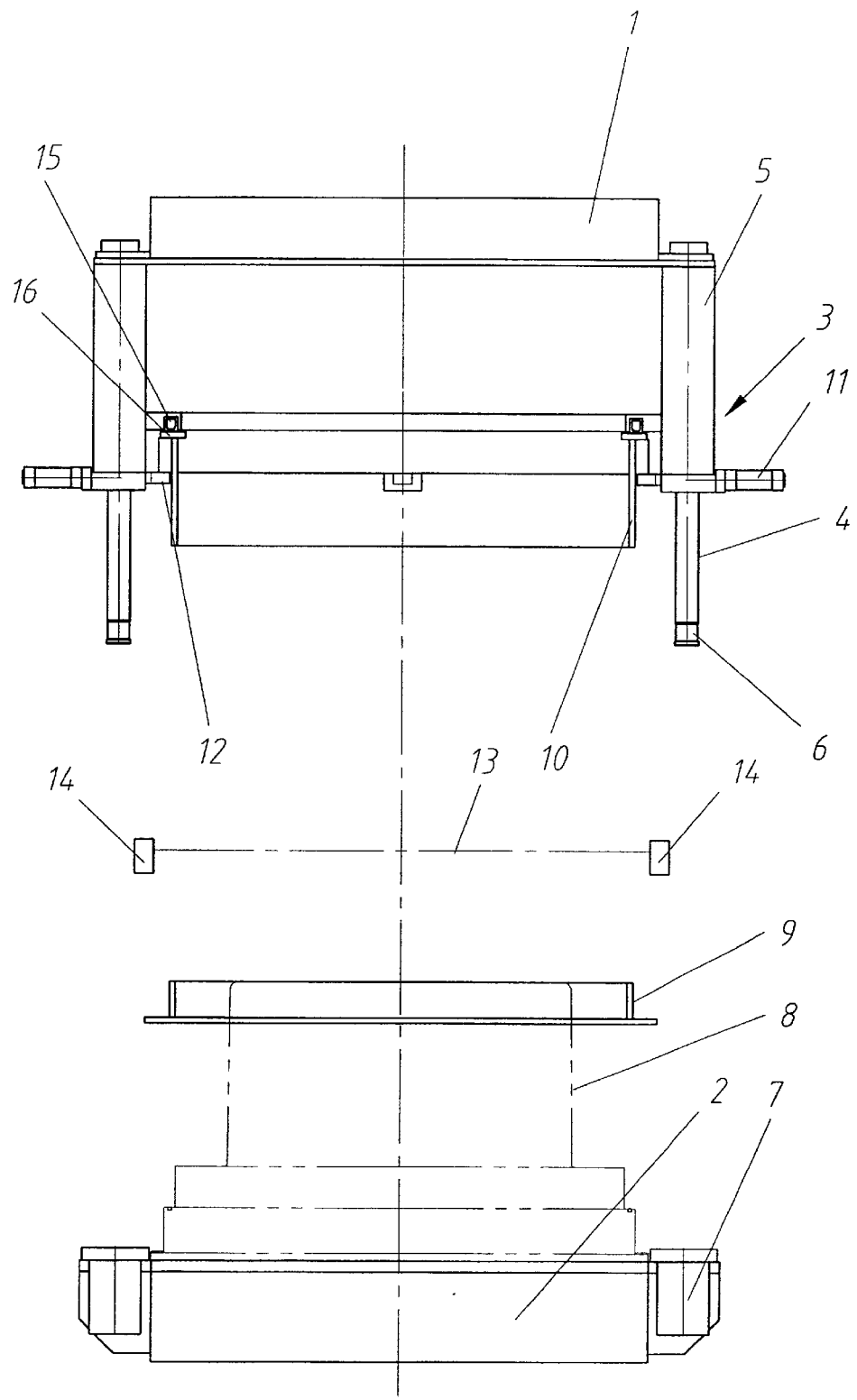
FIG. 1 shows an apparatus for the compressed-air shaping of thermoplastic materials in the moved-out position, with a large clamping frame.

The apparatus for shaping thermoplastic materials, i.e. for producing mouldings, for example refrigerator linings, comprises a suction-pressure bell 1, lying at the top, a lower part 2 and a locking device 3. The latter comprises locking bars 4, which are fitted in mountings 5 which are fixedly connected to the suction-pressure bell. The locking bars 4 have at their lower ends specially adapted end pieces 6, which interact with a respective coupling device 7, which devices are fastened to the lower part, thereby creating a quick-locking mechanism. With the aid of this locking device, it is possible to hold the suction-pressure bell 1 and the lower part 2 in the moved-together state corresponding to FIG. 2, to be precise independently of how high the pressure in the suction-pressure bell is, and the resultant force attempting to separate the suction-pressure bell from the lower part. Both the suction-pressure bell 1 and the lower part 2 are able to be moved in the vertical direction.

On the lower part 2 there is a mould 8 and a lower clamping frame 9. A corresponding upper clamping frame 10 is held on the upper part, i.e. on the suction-pressure bell 1, by means of working cylinders 11, which act with corresponding pushers 12 on the upper clamping frame. The film or sheet of a thermoplastic 13 to be shaped is drawn into the region between the two clamping frames 9 and 10 by means of conveying chains 14 arranged on both sides. The sealing between the upper clamping frame 10 and the suction-pressure bell 1 is performed by a seal 15, which is arranged on the circumferential rim of the open side of the suction-pressure bell 1 and is able to be pressed against the flange 16 of the upper clamping frame 10. For this purpose, the seal is able to be subjected to a pressure medium, so that it serves not only for sealing between the upper clamping frame and the suction-pressure bell but also for compensating for a tolerance at the upper clamping frame 10 or the film 13. To produce a moulded part, the previously heated-up film 13 is drawn into the region between the clamping frames 9 and 10 by means of the conveying chains 14, whereupon the suction-pressure bell 1 and the lower part 2 are moved together into the position which can be seen in FIG. 2 and, in this position, are locked against each other. The lower clamping frame 9 is able to be pressed against the film 13 by an additional drive. Then a preliminary sucking operation begins, in which the film is drawn into the suction-pressure bell. After the preliminary sucking operation, compressed air is introduced into the suction-pressure bell, so that the premoulded film or sheet is pressed against the mould 8, so that the moulding created on its inner side corresponds exactly to the shaping of the mould 8. The actual shaping operation is not described here in any more detail, because this is not the subject-matter of the invention.

Figure 2:
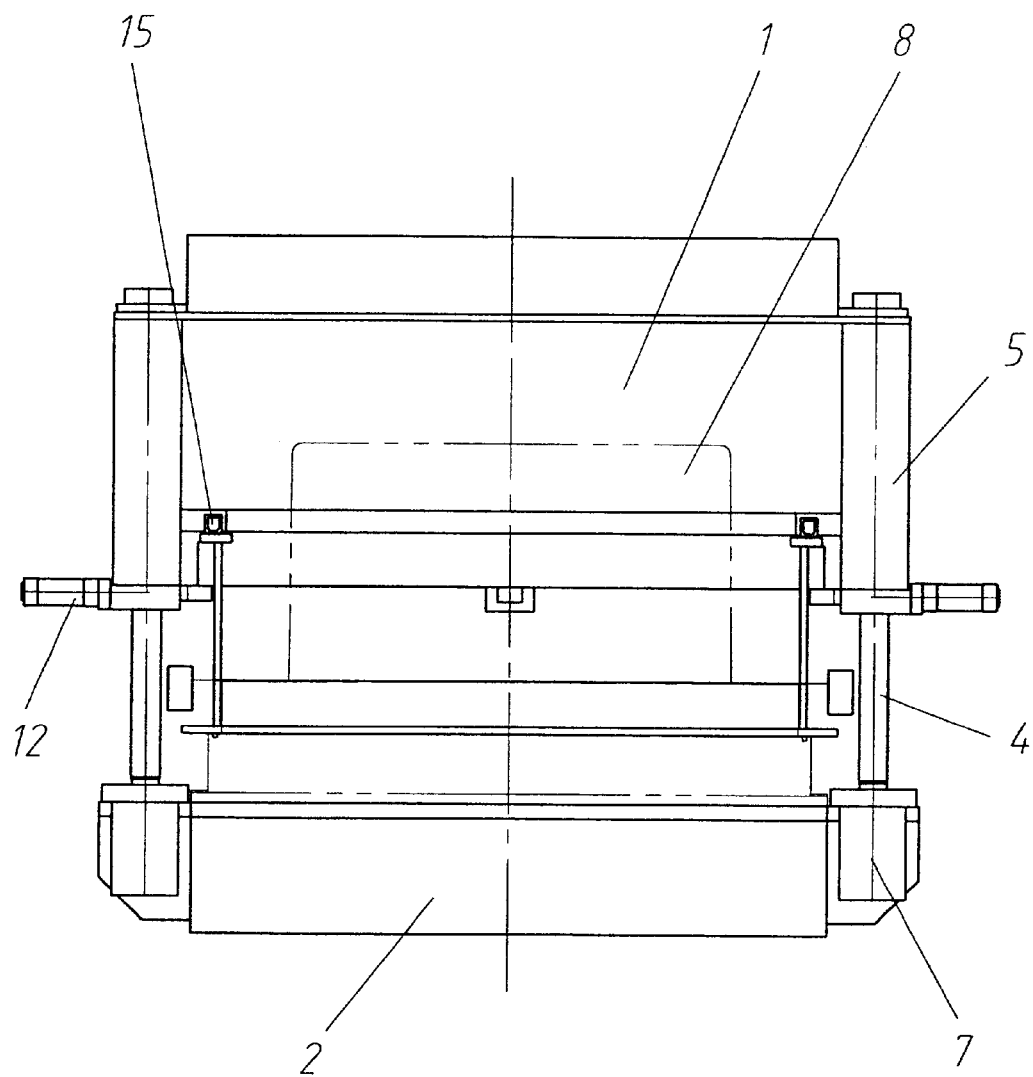
FIG. 2 shows the apparatus according to FIG. 1 in the moved-together position.
Figure 3:
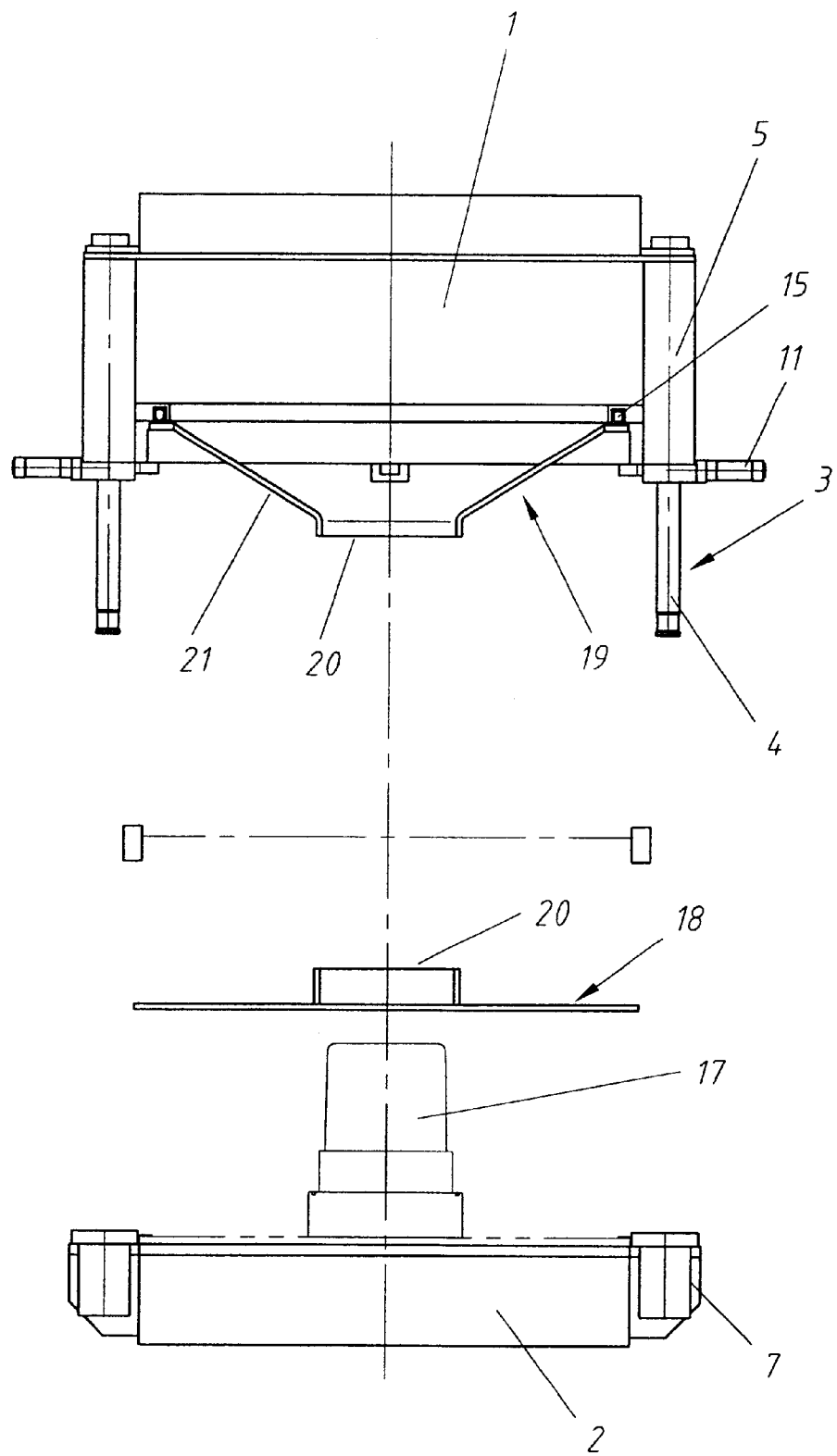
FIG. 3 shows the apparatus according to FIG. 1, with a significantly smaller clamping frame, in the moved-out position.
Figure 4:
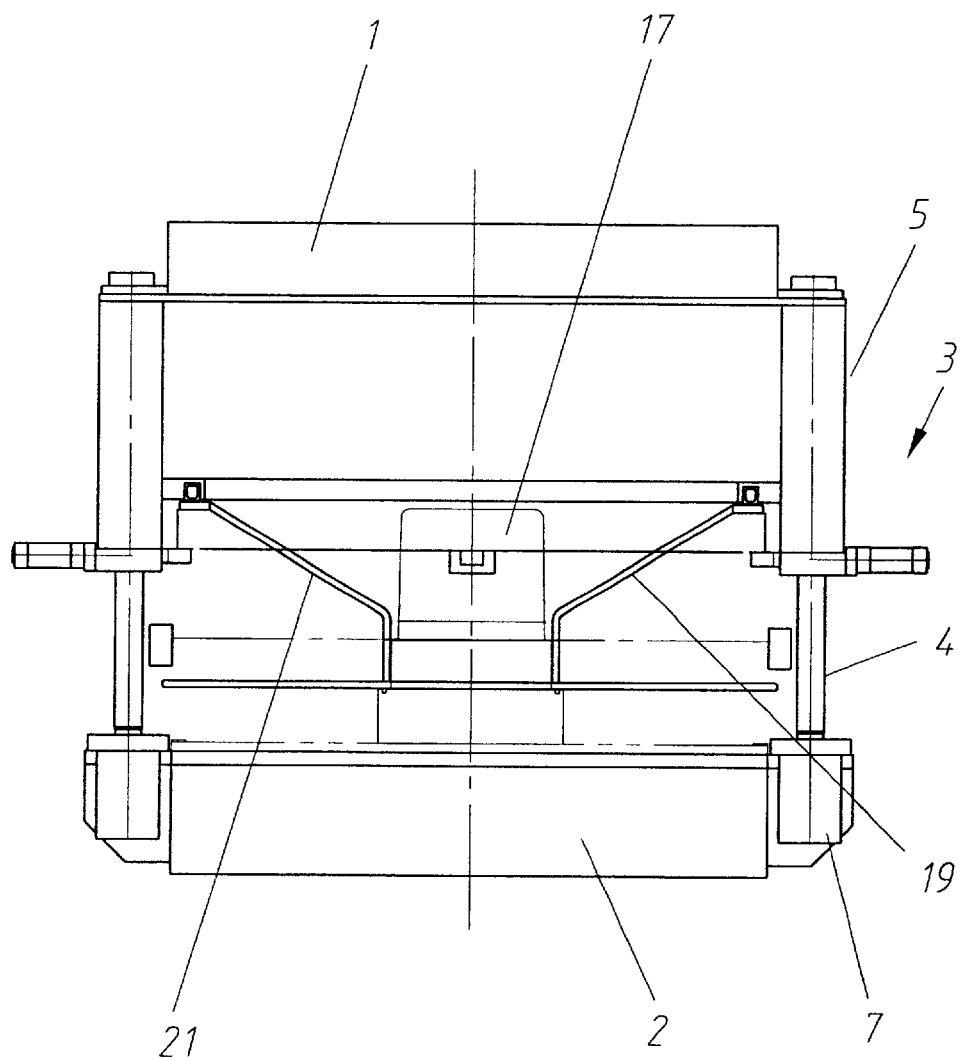
FIG. 4 shows the apparatus according to FIG. 3 in the moved-together position.

Represented in FIGS. 3 and 4 is a modification which clearly expresses the advantage of the design according to the invention. The modification consists in that different clamping 18 and 19, which in their passing-through surface area are intended for a significantly smaller mould 17, are used. It can be seen from the representations in FIGS. 3 and 4 that the passing-through surface area, 20 for the mould 17 is significantly smaller than is the case in the embodiment according to FIGS. 1 and 2. This results in a comparatively large surface area 21 between the seal 15 and the opening 20 in the upper frame 19. Although the pressure necessary for shaping in the suction-pressure bell acts on this surface area, the clamping frame 19 is free of the forces which are transferred to the clamping frame 19 in the prior art when the suction-pressure bell and the lower part are pressed together. These forces no longer occur, so that the clamping frame 19 only has to be made stable enough to allow it to absorb the pressure acting on the entire surface area, i.e. pressure acting on the resulting surface area between the seal 15 and the opening 20. This loading is not so great, since the upper clamping frame 19 is supported at the rim of its opening on the lower clamping frame 18. This pressure is significantly lower than was the case in the prior art, where the entire force for the pressing together of the suction-pressure bell and the lower part acted via the clamping frame.

Not represented is the necessary driving device to move the suction-pressure bell 1 into position in a production line for the production operation and subsequently into the demoulding position. Also not represented is a drive which moves the lower part 2 together with the mould 17 and the clamping frame 9 or 18 upwards into the locked position, as is represented in FIGS. 2 and 4.

What is claimed is:

1. An apparatus for shaping thermoplastic materials, comprising
    a suction-pressure bell;
    an upper clamping frame and a lower clamping frame between which the material to be shaped can be clamped, each said clamping frame having an opening surrounded by a rim which is received against said material during shaping;
    a seal between the suction-pressure bell and the upper clamping frame, which seal can be expanded under controllable force so that said material can be drawn into said suction-pressure bell during shaping;
    a mold which can be received through said openings against said material during shaping;
    a lower part supporting the mold and the lower clamping ring; and
    a force absorbing device which can connect the suction-pressure bell and lower part supporting the mold, which device absorbs forces occurring during shaping.

2. An apparatus according to claim 1, wherein the force-absorbing device comprises a plurality of locking bars arranged on the circumference of the suction-pressure bell and a plurality of coupling devices arranged on the lower part, said locking bars being fixed to said coupling devices to join the suction-pressure bell and the lower part.

3. An apparatus according to claim 1, further comprising drive devices which can compress the suction-pressure bell and the lower part against each other.

4. An apparatus according to claim 1 wherein the seal is accommodated in a groove of the suction-pressure bell and can be pressed against the upper clamping frame by a pressure medium for sealing between the suction-pressure bell and the clamping frame.

5. An apparatus according to claim 1 wherein the seal is an inflatable tubular seal.

6. An apparatus according to claim 1 further comprising a drive device for vertically displacing the suction-pressure bell.

7. An apparatus according to claim 1 further comprising a drive device for moving the lower part together with the mould and the clamping frame against the suction-pressure bell.

8. An apparatus according to claim 1 further comprising driveable pusher for holding the upper clamping frame in position on the suction-pressure bell.

* * * * *